(12) United States Patent
Feng et al.

(10) Patent No.: US 6,970,809 B2
(45) Date of Patent: Nov. 29, 2005

(54) AUTOMATED CONFIGURATION OF ON-CIRCUIT FACILITIES

(75) Inventors: Cheng A. Feng, Woodstock, NY (US); Jason D. Hibbeler, Williston, VT (US); Theodore G. Hoover, Jr., New Paltz, NY (US); Judith K. Ingles, Poughkeepsie, NY (US); Jhy-Chun Wang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 09/941,306

(22) Filed: Aug. 29, 2001

(65) Prior Publication Data

US 2003/0046616 A1 Mar. 6, 2003

(51) Int. Cl.⁷ .............................................. G06F 19/00
(52) U.S. Cl. ............................ 702/186; 716/4; 714/30; 714/38; 714/39; 714/47
(58) Field of Search ............................... 702/186, 182, 702/183; 714/30, 38, 39, 47; 716/4

(56) References Cited

U.S. PATENT DOCUMENTS

| | | | |
|---|---|---|---|
| 4,741,004 A | | 4/1988 | Kane |
| 5,081,297 A | | 1/1992 | Lebel et al. |
| 5,109,503 A | | 4/1992 | Cruickshank et al. |
| 5,450,349 A | * | 9/1995 | Brown et al. ................. 714/27 |
| 5,615,135 A | | 3/1997 | Waclawsky et al. |
| 5,657,253 A | * | 8/1997 | Dreyer et al. ............... 702/186 |
| 5,970,439 A | * | 10/1999 | Levine et al. ............... 702/186 |
| 6,212,491 B1 | * | 4/2001 | Bargh et al. ................. 703/14 |
| 6,360,337 B1 | * | 3/2002 | Zak et al. ..................... 714/47 |
| 6,460,107 B1 | * | 10/2002 | Rao et al. ................... 710/305 |
| 6,470,478 B1 | * | 10/2002 | Bargh et al. .................. 716/4 |
| 6,594,803 B1 | * | 7/2003 | Weber et al. .................. 716/5 |
| 6,601,149 B1 | * | 7/2003 | Brock et al. ................ 711/154 |
| 6,658,584 B1 | * | 12/2003 | Bass et al. .................. 713/502 |
| 6,678,777 B2 | * | 1/2004 | Rao et al. ................... 710/305 |
| 6,687,857 B1 | * | 2/2004 | Iwata et al. .................. 714/38 |
| 6,718,403 B2 | * | 4/2004 | Davidson et al. ............. 710/19 |
| 6,772,322 B1 | * | 8/2004 | Merchant et al. ........... 712/227 |
| 6,785,850 B2 | * | 8/2004 | Dzoba et al. ................ 714/46 |
| 6,789,217 B2 | * | 9/2004 | Slaugh et al. ................ 714/39 |

(Continued)

OTHER PUBLICATIONS

Internet Web page entitled "Windows 2000: Overview of Performance Monitoring", 46 pages, obtained from www.microsoft.com, date unknown.*

(Continued)

*Primary Examiner*—Patrick J. Assouad
(74) *Attorney, Agent, or Firm*—Lawrence D. Cutter; Jose Gutman; Fleit, Kain, Gibbons, Gutman, Bongini & Bianco P.L.

(57) ABSTRACT

A system and method for configuring a plurality of monitors, which are contained within a complex circuit, to monitor a valid combination of events within the complex circuit. Each monitor of the complex circuit is only able to monitor a subset of the total set of events which may be monitored. The present invention allows a user to select valid associations between events and monitors, and then processes those selected associations for configuration of the complex circuit. The selected associations may be stored and reused in the future.

20 Claims, 3 Drawing Sheets

U.S. PATENT DOCUMENTS

| | | | |
|---|---|---|---|
| 6,792,392 B1 * | 9/2004 | Knight | 702/186 |
| 2001/0034880 A1 * | 10/2001 | Dzoba et al. | 717/4 |
| 2001/0042226 A1 * | 11/2001 | Dzoba et al. | 714/39 |
| 2002/0004933 A1 * | 1/2002 | Dzoba et al. | 717/4 |
| 2002/0073255 A1 * | 6/2002 | Davidson et al. | 710/104 |
| 2002/0124237 A1 * | 9/2002 | Sprunt et al. | 717/127 |
| 2003/0028701 A1 * | 2/2003 | Rao et al. | 710/305 |
| 2003/0046522 A1 * | 3/2003 | Ehmann et al. | 713/1 |
| 2003/0046614 A1 * | 3/2003 | Brokish | 714/38 |
| 2003/0069724 A1 * | 4/2003 | Schubert et al. | 703/16 |
| 2004/0006724 A1 * | 1/2004 | Lakshmanamurthy et al. | 714/25 |

OTHER PUBLICATIONS

Internet Web page entitled "Windows 2000: Analyzing Processor Activity", 31 pages, obtained from www.microsoft.com, date unknown.*

Internet Web page entitled "Performance Analysis and Monitoring Using Hardware Counters", obtained from www.sun.com, 9 pages, Dec. 2001.*

Dongarra et al., "Using PAPI for hardware performance monitoring on Linux systems", IEEE, date unknown.*

Sprunt, "The Basic of Performance-Monitoring Hardware", IEEE, 2002.*

* cited by examiner

AUTOMATED CONFIGURATION OF ON-CIRCUIT FACILITIES

BACKGROUND OF THE INVENTION

1. Field of the Invention

This invention generally relates to the field of automated circuit configuration tools, and more particularly relates to the use of an automated method and system to configure profiles for circuit monitoring hardware and to ensure that the configured profile satisfies the limitations of the circuit monitoring hardware.

2. Description of Related Art

Complex electronic circuits, especially digital processing circuits, sometimes incorporate modules that are able to monitor events that occur within the circuit. These circuits often allow configuration of some or all of these event monitors to monitor one of a number of events that occur within the circuit. Complex microprocessor circuits are an example of circuits which incorporate a number of such event monitors. Examples of such monitors include counters which count intra-circuit events. Examples of events that are monitored in a complex microprocessor include cache memory misses, floating point operations, fixed point math operations, program branching and events associated with processing pipeline operations. Incorporating event monitors into these circuits provides an efficient method of monitoring the performance of the circuit under a variety of conditions.

Complex processing circuits often have a large number of events which may be monitored. These processing circuits often incorporate fewer monitors than there are events to be monitored but allow configuration of the monitors to allow selection of the events which are to be monitored. This architecture requires a selection of the subset of available events to monitor. The complex processing circuit may also limit the electrical connection of some events to only a subset of monitors. This results in further restrictions on the monitor configurations that can be chosen. In selecting events to be monitored, a designer must manually remember which events can be monitored by each monitor and limit his or her selections accordingly.

In order to define which events in a circuit are to be monitored, the designer must match each monitor to one of the events occurring within the circuit. This requires circuit designer to manually define which event is to be monitored by which monitor. When determining these event-monitor pairs, the designer must also manually remember which events have already been configured to be monitored so that multiple monitors are not wasted by monitoring the same event. This process becomes significantly difficult as the number of monitors and events increases within a circuit.

The manual configuration of the event-monitor pairs for a complex circuit is therefore tedious and requires a skilled designer to spend time to ensure that a specified configuration will work. Therefore a need exists for a simplified technique to specify event-monitor associations in circuits incorporating monitors of intra-circuit events.

SUMMARY OF THE INVENTION

According to a preferred embodiment of the present invention, the automated configuration of on-circuit monitoring facilities provides a method of compiling an on-circuit monitor profile to be used to characterize the performance of a processing circuit which consists of storing a set of allowable associations of a plurality of monitors and a plurality of events, presenting the set of allowable associations to a user, allowing the user to specify a selected set of monitor and event associations, wherein the selected set of monitor and event associations is a subset of the set of allowable associations, and preparing a monitor profile, wherein the monitor profile is to be used to configure on-circuit monitors.

The present invention, according to a preferred embodiment, comprises a system for compiling an on-circuit monitor profile used to characterize the performance of a processing circuit that has a monitor configuration file for storing a set of allowable associations of a plurality of monitors and a plurality of events, a display to display the set of allowable associations to a user, a user input for allowing the user to specify a selected set of monitor and event associations, wherein the selected set of monitor and event associations is a subset of the set of allowable associations, and a monitor profile output, electrically connected to the user input, wherein the monitor profile output is to be used to configure on-circuit monitors.

DESCRIPTION OF THE PREFERRED EMBODIMENTS

The present invention, according to the illustrated embodiments, overcomes problems with the prior art by providing users with a pre-configured, easy-to-grasp representation of valid event-monitor associations and allowing the user to select desired associations from this presentation of valid associations. The present invention, as shown by the illustrated preferred embodiments, also stores the selected associations of event-monitor associations for later use or recall for modification.

Figure 1:
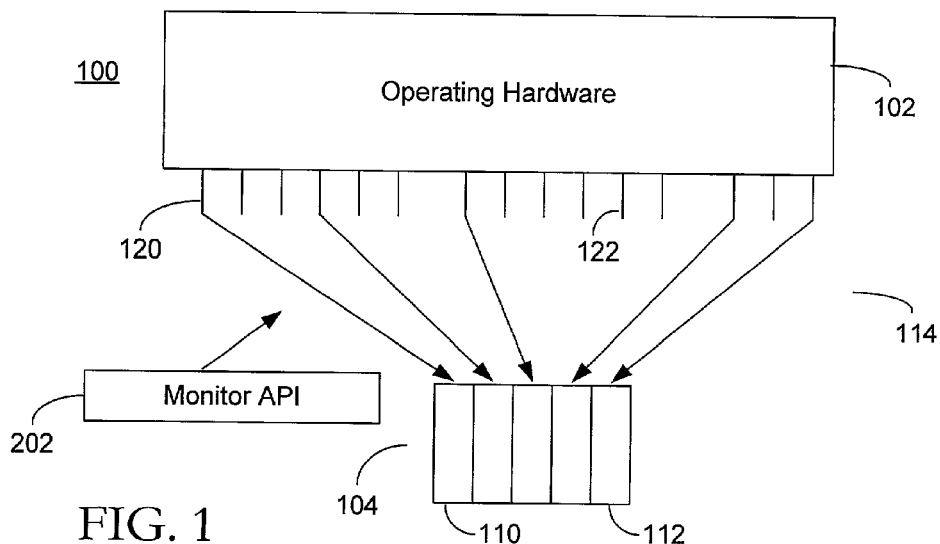
FIG. 1 is a block diagram illustrating a complex circuit that incorporates monitoring facilities.

An example circuit 100 which will utilize the benefits of the present invention is shown in FIG. 1. Circuit 100 comprises the operating hardware 102 and an on-circuit group of monitors 104. The on-circuit group of monitors 104 in the illustrated preferred embodiment contains a plurality of monitors, e.g. monitor N 110 and monitor M 112. The operating hardware 100 has a number of events, e.g. event A 120 and event B 122, which may be monitored by one of the monitors contained in the group of monitors 104.

The example circuit 100 is shown to be configured so that each monitor has been connected to an associated intra-circuit event. The monitors of the illustrated example circuit 100 are event counters and each event counter accepts one input. Alternative embodiments may utilize monitors with multiple inputs. The connection between each of the counters in the group of monitors 104 and the event outputs of the operating hardware are shown by the connections 114. Connections 114 may be implemented in various embodiments by electrical switching which connects the event outputs to the associated monitor. Other connection techniques are known to practitioners in the relevant arts. The connections 114 are controlled in the illustrated embodiment by software through the monitor Application Program Interface (API) software component 202.

Figure 2:
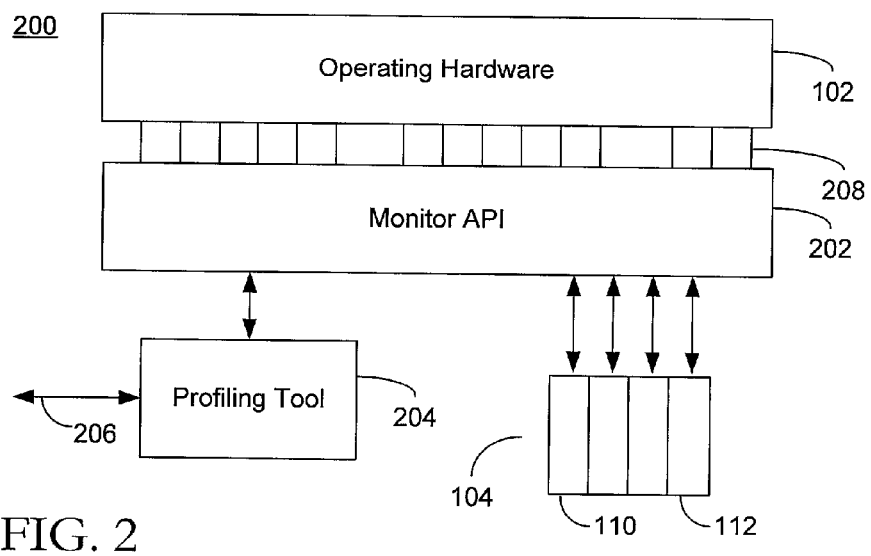
FIG. 2 is a block diagram illustrating a complex circuit that incorporates monitoring facilities and that is able to be configured by a preferred embodiment of the present invention.

FIG. 2 illustrates an example processor architecture 200 which is configured through the use of a preferred embodiment of the present invention. The example processor architecture 200 is a microprocessor that includes software execution hardware as the operating hardware 102 and a group of monitors 104 that contains, in this example, four counters, including exemplary counter N 110 and counter M 112. The example processor architecture 200 is similar to a Power PC 604e Microprocessor. The example processor architecture 200 further contains a monitor API software component 202. The monitor API software component 202 configures the processor hardware so as to associate selected events with counters in the group of monitors 104 of the illustrated embodiment. The monitor API software component 202 of the illustrated embodiment configures routing switches within the microprocessor to select and route the event indicators 208 that are associated with selected events to the proper counter within the group of monitors 104. The monitor API software component 202 also is able to read the value of the counters within the group of monitors 104 and provide the counter values to a profiling tool 204. The profiling tool 204 communicates to an external process through an external interface 206. The profiling tool 204 relays the counter values through the external interface 206 for analysis. Profiling tool 204 may store counter values during processing by the operating hardware and then provide those stored values through the external interface 206 after the processing is performed by the operating hardware 102. The profiling tool 204, according to a preferred embodiment, is embedded code resident in a memory of the microprocessor architecture. However, other alternative arrangements for providing the profiling tool 204 in a system should be obvious to those having ordinary skill in the art in view of the present discussion. For example, the profiling tool 204 may comprise a computing circuit external to the microprocessor architecture that is communicatively coupled to the monitor API 202 that is preferably embedded in the microprocessor architecture.

The profiling tool 204 also accepts monitor configuration data through external interface 206. The configuration data is provided to the monitor API software component 202 to command the proper configuration of the monitoring hardware so that the selected events 206 are associated with the specified counters in the group of monitors 104. External interface 206 in the illustrated embodiment utilizes an intermediate file, counter group configuration file 306, as the communications mechanism. External interface 206 in other embodiments of the present invention may be an interprocess communications mechanism to another processing thread that is executing within the same processor as the operating hardware 102. Alternative embodiments may also utilize a communications path external to the processor for analysis on another processor.

Figure 3:
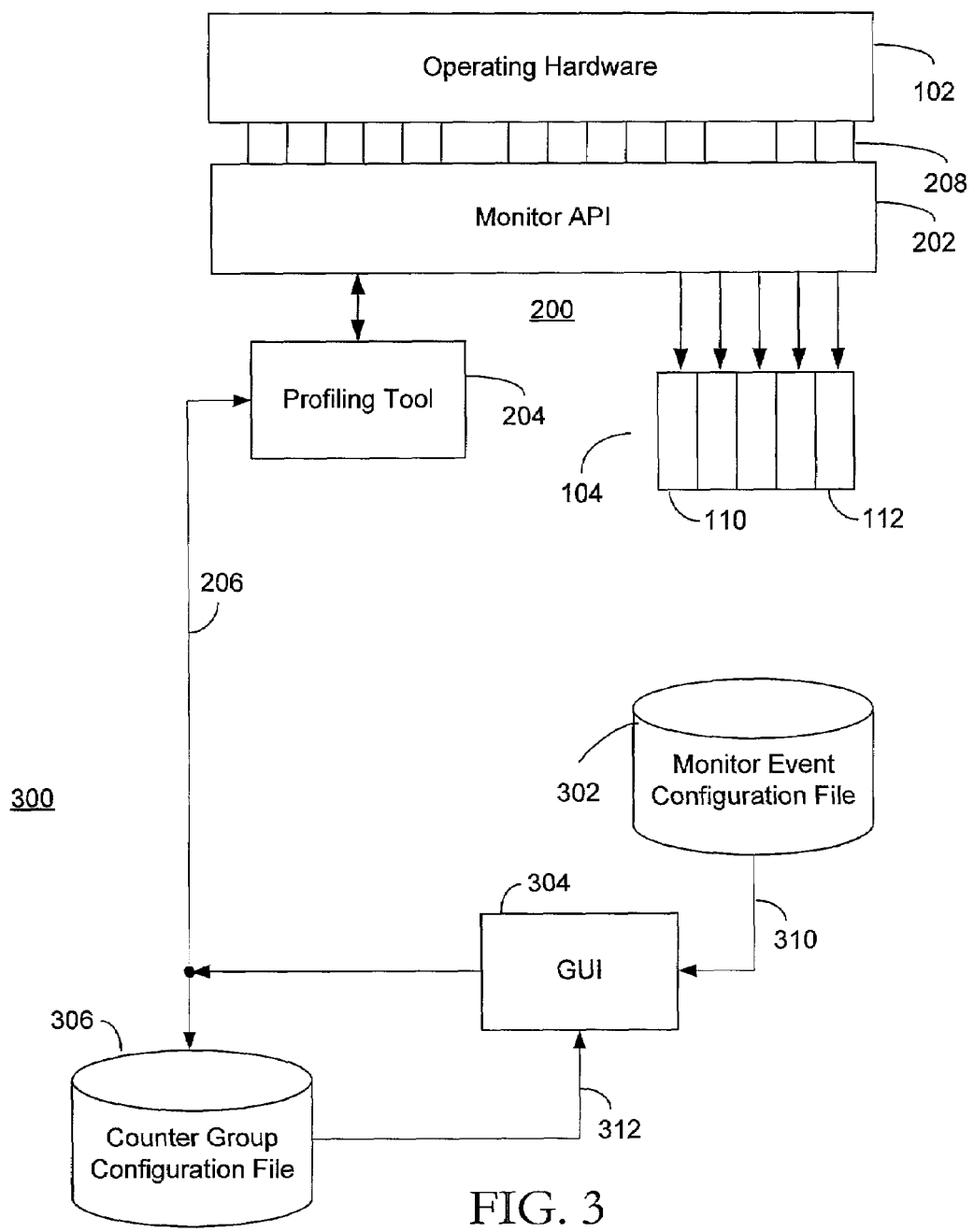
FIG. 3 is a block diagram illustrating a complex circuit that includes on-circuit monitoring facilities and an automated configuration apparatus according to a preferred embodiment of the present invention.

FIG. 3 illustrates an example configuration apparatus 300 according to a preferred embodiment of the present invention. Example configuration apparatus 300 includes an example processor architecture 200 that is connected to a Graphical User Interface (GUI) software component 304. Example embodiments may execute the GUI software component on the same computer as the example processor architecture 200, or a separate processor may be utilized by alternative embodiments. The GUI 304 according to a preferred embodiment of the present invention is used to present to a user the associations that may be made between events in the operating hardwares 102 and monitors within the group of monitors 104. The available associations between events and monitors may be limited by the processor hardware such that some events may only be monitored by a subset of the monitors in the group of monitors 104.

The allowable combination of events and monitors in the illustrated embodiment is stored in the monitor event configuration file 302. The monitor event configuration file 302 contains data dependent upon the example processor architecture 200. The monitor event configuration file 302, according to the present example, is communicatively coupled (via a data interface 310) with the GUI 304. The data stored in the monitor event configuration file 302 is used by the GUI 304 to present and verify allowable associations of events and monitors to users of the illustrated preferred embodiment of the present invention.

Figure 4:
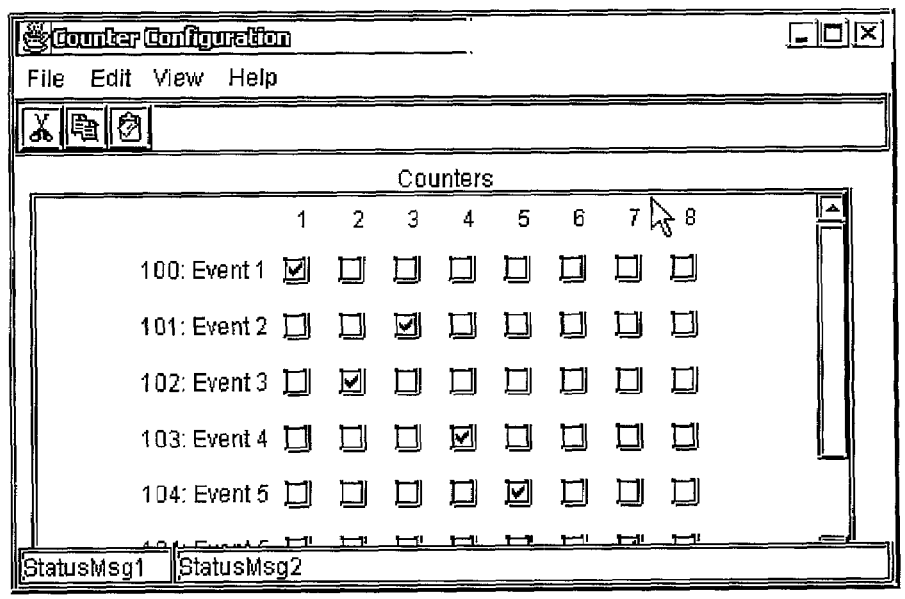
FIG. 4 is an exemplary Graphical User Interface (GUI) display for use with a preferred embodiment of the present invention.

The GUI 304 according to the illustrated preferred embodiment is used to present to a designer a graphical representation of the possible associations of events and counters which may be selected. An example GUI display 400 presented by the illustrated preferred embodiment is shown in FIG. 4 and is discussed below. The GUI 304 reads a list of allowable event to counter assignments from the Monitor Event Configuration File 302. The output of the GUI 304 is an on-circuit monitor profile. The on-circuit monitor profile is used to configure the example processor architecture 200, and especially the monitor API software component 202. The on-circuit monitor profile in the illustrated embodiment is also stored in the monitor group configuration file 306 for future recall into the GUI 304 through file to GUI link 312 for reuse or modification. The on-circuit monitor profile may also be directly read by the profiling tool 204 of the illustrated embodiment directly or the on-circuit monitor profile may be read by analysis software in association with monitor data collected by the profiling tool 204 in order to determine the configuration of the monitoring hardware in the example processor architecture 200 when analyzing the counter data.

FIG. 4 illustrates an example presentation 400 in a GUI 304 of the contents of a sample monitor event configuration file 302. GUI 304 receives the monitor event configuration from the monitor event configuration file 302 and displays the data in an easily readable format.

Example presentation 400 shows one row for each event which may be monitored, which are identified as event 1, 2, 3 and so on, and one column for each counter, identified as counter 1, 2, 3 through 8. A box at the intersection of each row and column allows a user to select an association between the event and counter common to that box. The user may use the facilities of the GUI interface 302 to select a box, and the GUI interface will record that selection. The selection is indicated in the example presentation 400 as a check mark in the box. Example presentation 400 shows selections associating event 1 with counter 1, event 2 with counter 3, event 3 with counter 2 and so on. The selected associations are then stored into the on-circuit monitor profile. The processing associated with example presentation 400 may verify that selected associations are valid, as defined within a monitor event configuration file 302, and notify the user if a selected association is invalid.

Figure 5:
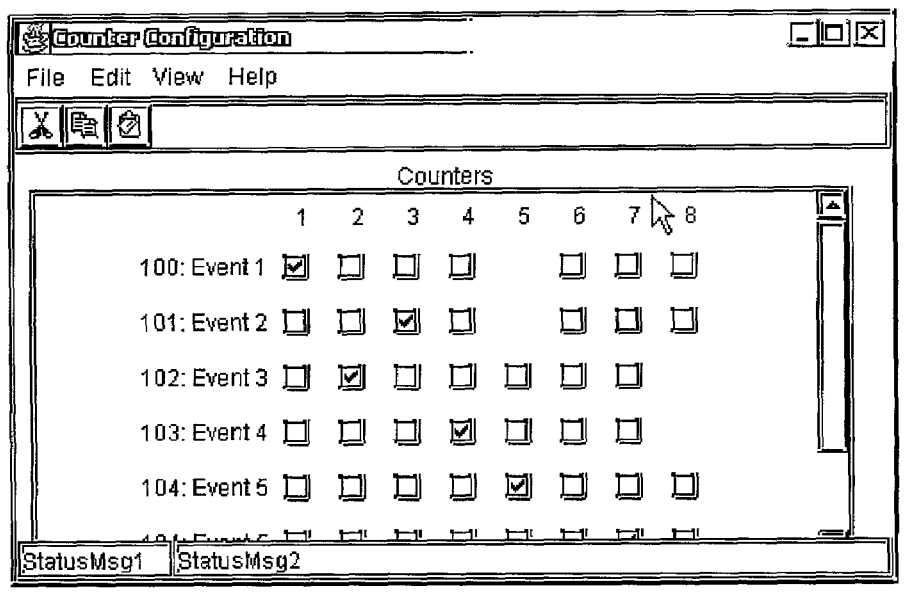
FIG. 5 is an alternative Graphical User Interface (GUI) display for use with a preferred embodiment of the present invention.

FIG. 5 illustrates an alternative presentation 500 that indicates that some monitors may not be associated with some events. The absence of a mark at a column-row intersection indicates that the counter cannot monitor that event. Alternative presentation 500 does not include boxes at the intersection of some rows and columns. The absence of these boxes reflects that the association represented by that row and column is not allowable. Alternative presentation 500 shows an absence of selection boxes for the associations of counter 5 to events 1 and 2 as well as for the association of counter 8 to events 3 and 4. These associations are not allowed in the example processor architecture 200 due to its design. The data which contains the allowable associations is stored in the monitor event configuration file 302.

The present invention allows significantly greater productivity and ease of flexibility in configuring on-circuit testing facilities by allowing software developers to easily configure on-circuit test facilities and to store and recall the configurations that have been set up by the developer. The present invention allows a user to recall stored configurations for re-use or modification into new test configurations. The ability to easily and quickly reconfigure the on-circuit test facilities reduces the development time required to optimize software and encourages software developers to optimize their software. The present invention also easily allows and encourages the user to evaluate alternative system configurations and/or processing architectures. The more fully optimized software which is economically developed with the present invention results in faster and more efficient computer and supercomputer utilization. The present invention also allows the pre-definition of a variety of on-circuit test facility configurations that can be easily used by less experienced software developers to gather data associated with phenomena of interest. The easy recall and modification of these pre-defined configurations encourages the use of on-circuit test facilities and also encourages the use of various configurations of the on-circuit test facilities to better characterize the operations of interest.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of compiling an on-circuit monitor profile used to configuring circuits to characterize the performance of a processing circuit, the method comprising the steps of:

storing, on a first processing system, a set of allowable associations between a plurality of monitors and a plurality of events, wherein the plurality of monitors operate on a second processing system;

presenting, on a display of the first processing system, the set of allowable associations to a user so as to illustrate prohibited monitor and event combinations and prevent selection of prohibited monitor and event combinations;

accepting, on the first processing system, a complete user selected set of monitor and event associations, wherein the user selected set of monitor and event associations is a subset of the set of allowable associations selected from the display;

preparing a complete monitor profile based on the complete user selected set of monitor and event associations.

2. A method according to claim 1, wherein the step of presenting the set of allowable associations comprises the step of presenting a graphical interface to the user that contains a complete presentation of the entire set of allowable associations.

3. A method according to claim 1, wherein the accepting step comprises the step of accepting one or more inputs from the user through a graphical interface, wherein the graphical user interface only presents a valid monitor-event combinations for a plurality of monitors.

4. A method according to claim 1, wherein one or more of the monitors within the plurality of monitors is able to monitor only a subset of the plurality of events.

5. A method of compiling an on-circuit monitor profile used for configuring circuits to characterize the performance of a processing circuit, the method comprising the steps of:

storing, on a first processing system, a set of allowable associations between a plurality of monitors and a plurality of events, wherein the plurality of monitors operate on a second processing system;

accepting, through a user interface process on the first processing system, a user selected set of monitor and event associations;

verifying, in the user interface process on the first processing system, that the selected set of monitor and event associations is a subset of the list of allowable associations;

notifying the user if one or more monitor and event associations within the selected set of monitor and event associations is not valid;

assembling, in response to verifying that the selected set of monitor and event associations is a subset of the list of allowable associations, a complete set of selected monitor and event associations; and preparing, on the first processing system in response to the assembling, a monitor profile based on the complete set of monitor and event associations.

6. A system for compiling an on-circuit monitor profile used to configuring circuits to characterize the performance of a processing circuit, the system comprising:

a monitor configuration file, stored on a first processing system, for storing a set of allowable associations of a plurality of monitors and a plurality of events, wherein the plurality of monitors operate on a second processing system;

a display, communicatively coupled to the monitor configuration file, for displaying the set of allowable associations to a user so as to illustrate prohibited monitor and event combinations and prevent selection of prohibited monitor and event combinations;

a user input, operating on the first processing system, for accepting a complete selected set of monitor and event associations from a user, wherein the selected set of monitor and event associations is a subset of the set of allowable associations selected from the display;

a monitor profile output, communicatively coupled to the user input, wherein the monitor profile output comprises the complete selected set of monitor and event associations and is to be used to configure on-circuit monitors; and a monitor configuration generator, communicatively coupled to the monitor configuration file, the user input, the display and the monitor profile output, that prepares the data in the monitor configuration file for display on the display and that prepares the complete selected set of monitor and event associations for the monitor profile output.

7. A system according to claim 6, wherein the display comprises a graphical user interface that contains a complete presentation of the entire set of allowable associations.

8. A system according to claim 6, wherein the user input accepts inputs in conjunction with a graphical interface.

9. A system according to claim 6, wherein at least one of the monitors within the plurality of monitors is able to monitor only a subset of the plurality of events.

10. A system for compiling an on-circuit monitor profile used for configuring circuits to characterize the performance of a processing circuit, the system comprising:

a monitor configuration file for storing, on a first processing system, a set of allowable associations of a plurality of monitors and a plurality of events;

a user input interface, operating on the first processing system, for accepting a complete selected set of monitor and event associations from a user;

a monitor profile output, communicatively coupled to the user input, wherein the monitor profile output comprises the complete selected set of monitor and event associations and is to be used to configure on-circuit monitors, and a monitor configuration generator, communicatively coupled to the monitor configuration file, the user input and the monitor profile output, for verifying that the complete selected set of monitor and event associations is a subset of the list of allowable associations and preparing, in response to verifying that the complete selected set of monitor and event associations is a subset of the list of allowable associations.

11. A system for compiling an on-circuit monitor profile used to configuring circuits to characterize the performance of a processing circuit, the system comprising:

means for storing, operating on a first processing system, a set of allowable associations of a plurality of monitors and a plurality of events, wherein the plurality of monitors operate on a second processing system;

means for displaying the set of allowable associations to a user so as to illustrate prohibited monitor and event combinations and prevent selection of prohibited monitor and event combinations, wherein the means for displaying is communicatively coupled to the monitor configuration file;

means for accepting a complete set of user selected monitor and event associations, operating on the first processing system, wherein the complete set of user selected monitor and event associations is a subset of the set of allowable associations selected from the display; and means for outputting a monitor profile, the means for outputting being communicatively coupled to the user input, wherein the monitor profile comprises the complete set of user selected monitor and event associations and is to be used to configure on-circuit monitors on a second processing system.

12. A computer readable medium including computer instructions for compiling an on-circuit monitor profile used to configuring circuits to characterize the performance of a processing circuit, the computer instructions comprising instructions for:

storing, on a first processing system, a set of allowable associations between a plurality of monitors and a plurality of events, wherein the plurality of monitors operate on a second processing system;

presenting, on a display of the first processing system, the set of allowable associations to a user so as to illustrate prohibited monitor and event combinations and prevent selection of prohibited monitor and event combinations;

accepting, on the first processing system, a complete user selected set of monitor and event associations, wherein the user selected set of monitor and event associations is a subset of the set of allowable associations selected from the display;

preparing a complete monitor profile based on the complete user selected set of monitor and event associations.

13. A computer readable medium according to claim 12, wherein the instructions for presenting the set of allowable associations comprises instructions for presenting a graphical interface to the user that contains a complete presentation of the entire set of allowable associations.

14. A computer readable medium according to claim 12, wherein the instructions for accepting comprise instructions for accepting one or more inputs from the user through a graphical interface, wherein the graphical user interface only presents valid monitor-event combinations for a plurality of monitors.

15. A computer readable medium including computer instructions for compiling an on-circuit monitor profile used for configuring circuits to characterize the performance of a processing circuit, the computer instructions comprising instructions for:

storing, on a first processing system, a set of allowable associations between a plurality of monitors and a plurality of events, wherein the plurality of monitors operate on a second processing system;

accepting, through a user interface process on the first processing system, a user selected set of monitor and event associations;

verifying, in the user interface process on the first processing system, that the selected set of monitor and event associations is a subset of the list of allowable associations;

notifying the user if one or more monitor and event associations within the selected set of monitor and event associations is not valid; assembling, in response to verify that the selected set of monitor and event associations is a subset of the list of allowable associations, a complete set of selected monitor and event associations;

preparing, on the first processing system in response to the assembling, a monitor profile based on the complete user selected set of monitor and event associations.

16. A method according to claim 1, further comprising communicating the complete monitor profile from the first processing system to the second processing system through an external interface of the second processing system.

17. A method according to claim 5, further comprising communicating the complete monitor profile from the first processing system to the second processing system through an external interface of the second processing system.

18. A method according to claim 1, further comprising:

storing the complete monitor profile into a stored complete monitor profile on the first processing system;

retrieving the stored complete monitor profile; and preparing, in response to the retrieving, a restored complete monitor profile based upon the stored complete monitor profile.

19. A method according to claim 1, wherein the presenting comprises displaying the set of allowable associations in its entirety.

20. A method according to claim 2, wherein the step of presenting comprises:

displaying a plurality of monitors arranged as columns in the graphical user interface;

displaying a plurality of events arranged as rows in the graphical user interface;

displaying an indicator at each respective intersection of the rows and the columns that corresponds to an allowable association of a respective monitor and a respective event associated with the respective intersection; and displaying no indicator at each respective intersection of the rows and the columns that corresponds to an association of a respective monitor and a respective event associated with the respective intersection that is not allowable.

* * * * *

UNITED STATES PATENT AND TRADEMARK OFFICE
CERTIFICATE OF CORRECTION

PATENT NO. : 6,970,809 B2
DATED : November 29, 2005
INVENTOR(S) : Cheng A. Feng et al.

It is certified that error appears in the above-identified patent and that said Letters Patent is hereby corrected as shown below:

Column 6,
Line 49, change "only presents a valid monitor-event" to -- only presents valid monitor-event --.

Column 9,
Line 15, change "to verify that" to -- to verifying that --.

Signed and Sealed this

Eleventh Day of April, 2006

JON W. DUDAS
*Director of the United States Patent and Trademark Office*